US012710287B2

(12) United States Patent
Gehtman et al.

(10) Patent No.: US 12,710,287 B2
(45) Date of Patent: Aug. 18, 2026

(54) DRONE PRE-MAPPING

(71) Applicant: Dell Products L.P., Round Rock, TX (US)

(72) Inventors: Yevgeni Gehtman, Modi'in (IL); Tomer Shachar, Beer-Sheva (IL); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/757,389

(22) Filed: Jun. 27, 2024

(65) Prior Publication Data

US 2026/0002794 A1 Jan. 1, 2026

(51) Int. Cl.

*G05D 109/20* (2024.01)
*G01C 21/00* (2006.01)
*G05D 1/246* (2024.01)
*H04B 10/112* (2013.01)

(52) U.S. Cl.

CPC ..... *G01C 21/3885* (2020.08); *G01C 21/3837* (2020.08); *G05D 1/246* (2024.01); *H04B 10/1123* (2013.01); *G05D 2109/20* (2024.01)

(58) Field of Classification Search

None
See application file for complete search history.

(56) References Cited

U.S. PATENT DOCUMENTS

| | | | | |
|---|---|---|---|---|
| 8,588,870 | B1 | 11/2013 | Vargantwar | |
| 10,224,739 | B2 * | 3/2019 | Kaag | H02J 7/35 |
| 10,797,863 | B2 * | 10/2020 | Chen | G06N 5/022 |
| 11,169,510 | B2 * | 11/2021 | Menzel | G05B 19/0426 |
| 12,117,304 | B2 | 10/2024 | Quint et al. | |
| 12,148,311 | B2 | 11/2024 | Yogesha et al. | |

(Continued)

FOREIGN PATENT DOCUMENTS

| | | | |
|---|---|---|---|
| CA | 3206977 | A1 | 5/2024 |
| CN | 110673093 | A | 1/2020 |

(Continued)

OTHER PUBLICATIONS

Shachar et al. "Non-Interrupted Remote Device Backup to a Cloud Platform" U.S. Appl. No. 18/656,162, filed May 6, 2024, 44 pages.

(Continued)

*Primary Examiner* — Hunter B Lonsberry
*Assistant Examiner* — Robert L Pinkerton
(74) *Attorney, Agent, or Firm* — Amin, Turocy & Watson, LLP

(57) ABSTRACT

In an example, a system performs the following. The system, while the system is traveling to a destination associated with a first entity, determines that an edge device associated with a second entity is located within a specified distance from the system, wherein the system is associated with the first entity. The system maps at least part of a physical area associated with the edge device, to produce mapping information. The system enables the mapping information to be accessible to the second entity, wherein the mapping information being accessible to the second entity enables a drone associated with the second entity to use the mapping information to establish a light-based communications channel with the edge device.

20 Claims, 11 Drawing Sheets

(56) References Cited

U.S. PATENT DOCUMENTS

| | | | | |
|---|---|---|---|---|
| 12,468,045 | B1* | 11/2025 | Pottle | G01S 19/396 |
| 2013/0179057 | A1 | 7/2013 | Fisher et al. | |
| 2013/0315604 | A1 | 11/2013 | LoPresti | |
| 2015/0345984 | A1 | 12/2015 | Graham | |
| 2020/0119805 | A1 | 4/2020 | Miyakawa | |
| 2020/0389232 | A1 | 12/2020 | Danesh | |
| 2021/0065073 | A1 | 3/2021 | Maeda et al. | |
| 2021/0213935 | A1* | 7/2021 | Lu | B60C 23/04 |
| 2021/0389143 | A1 | 12/2021 | Kim et al. | |
| 2021/0407303 | A1 | 12/2021 | Yogesha et al. | |
| 2022/0161815 | A1* | 5/2022 | Van Beek | B60W 50/16 |
| 2023/0281847 | A1* | 9/2023 | Zhong | G06T 7/70 382/104 |
| 2024/0039339 | A1 | 2/2024 | Park | |
| 2024/0340083 | A1 | 10/2024 | Hariq | |
| 2024/0411314 | A1* | 12/2024 | Manouchehri | G05D 1/226 |
| 2025/0060749 | A1* | 2/2025 | Hall | G05D 1/48 |
| 2025/0112697 | A1 | 4/2025 | Mangio | |
| 2025/0206331 | A1* | 6/2025 | Sane | B60W 50/0205 |
| 2025/0253948 | A1 | 8/2025 | Quintana Sanchez | |
| 2025/0297867 | A1* | 9/2025 | Liu | G01C 21/3815 |

FOREIGN PATENT DOCUMENTS

| | | | |
|---|---|---|---|
| CN | 216357320 | U | 4/2022 |
| CN | 121308845 | A | 1/2026 |
| JP | 7429908 | B2 | 2/2024 |
| KR | 102193973 | B1 | 12/2020 |
| WO | 2017174819 | A1 | 10/2017 |
| WO | 2020217646 | A1 | 10/2020 |
| WO | 2021203242 | A1 | 10/2021 |

OTHER PUBLICATIONS

Gehtman, et al. "Advance Orientation of a Drone Antenna" U.S. Appl. No. 18/757,350, filed Jun. 27, 2024, 50 pages.

Gehtman, et al. "Drone Decision-Making for Task Completion" U.S. Appl. No. 18/757,355, filed Jun. 27, 2024, 44 pages.

Office Action mailed Jan. 12, 2026 for U.S. Appl. No. 18/757,355, 41 pages.

Office Action mailed Jun. 3, 2026 for U.S. Appl. No. 18/656,162, 39 pages.

Final Office Action mailed Jun. 3, 2026 for U.S. Appl. No. 18/757,355, 61 pages.

Notice of Allowance mailed Apr. 14, 2026 for U.S. Appl. No. 18/757,350, 31 pages.

* cited by examiner

800

WHILE A SYSTEM IS TRAVELING TO A DESTINATION ASSOCIATED WITH A FIRST ENTITY, DETERMINING THAT AN EDGE DEVICE ASSOCIATED WITH A SECOND ENTITY IS LOCATED WITHIN A SPECIFIED DISTANCE FROM THE SYSTEM, WHEREIN THE SYSTEM IS ASSOCIATED WITH THE FIRST ENTITY 804

MAPPING AT LEAST PART OF A PHYSICAL AREA ASSOCIATED WITH THE EDGE DEVICE, TO PRODUCE MAPPING INFORMATION 806

ENABLING THE MAPPING INFORMATION TO BE ACCESSIBLE TO THE SECOND ENTITY, WHEREIN THE MAPPING INFORMATION BEING ACCESSIBLE TO THE SECOND ENTITY ENABLES A DRONE ASSOCIATED WITH THE SECOND ENTITY TO USE THE MAPPING INFORMATION TO ESTABLISH A LIGHT-BASED COMMUNICATIONS CHANNEL WITH THE EDGE DEVICE 808

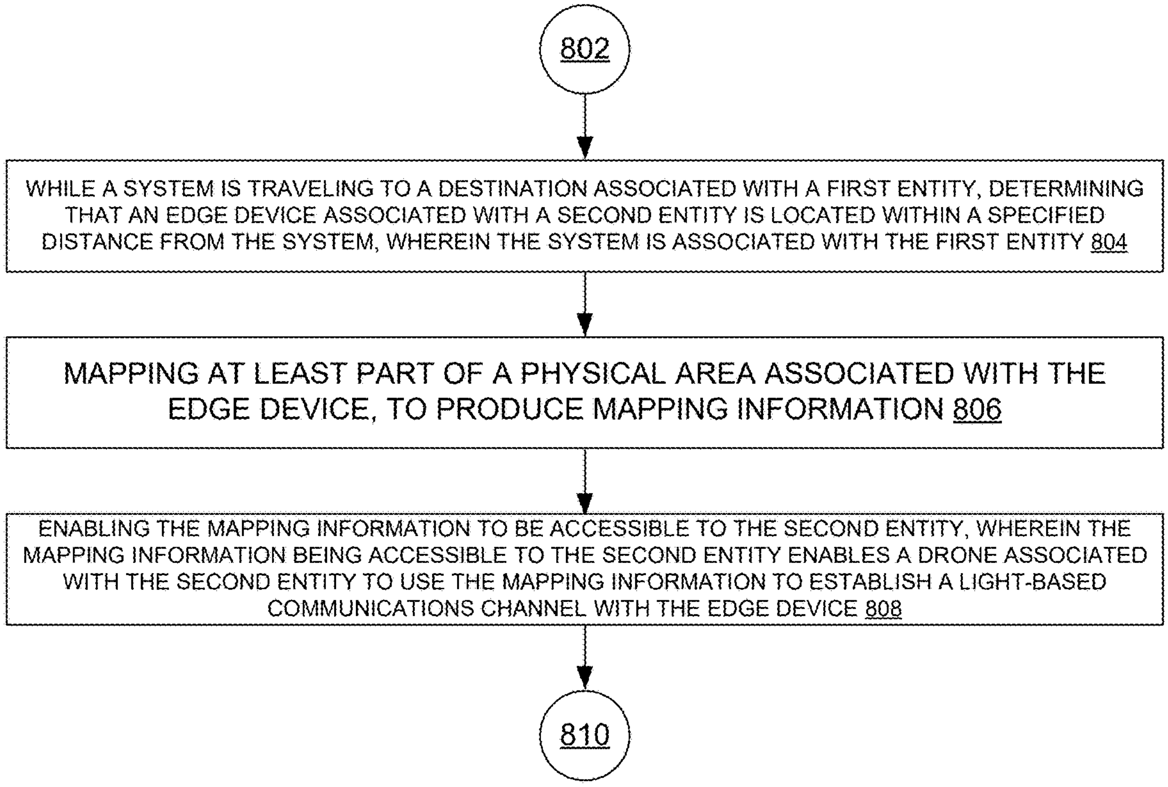

WHILE TRAVELING TO A DESTINATION ASSOCIATED WITH A FIRST ENTITY, DETERMINING THAT AN EDGE DEVICE ASSOCIATED WITH A SECOND ENTITY IS WITHIN A PREDEFINED DISTANCE FROM THE SYSTEM, WHEREIN THE SYSTEM IS ASSOCIATED WITH THE FIRST ENTITY 904

MAPPING AT LEAST PART OF A PHYSICAL AREA ASSOCIATED WITH THE EDGE DEVICE, TO PRODUCE MAPPING INFORMATION, A DRONE OF THE SECOND ENTITY ABLE TO USE THE MAPPING INFORMATION TO ESTABLISH A LIGHT-BASED COMMUNICATIONS CHANNEL WITH THE EDGE DEVICE 906

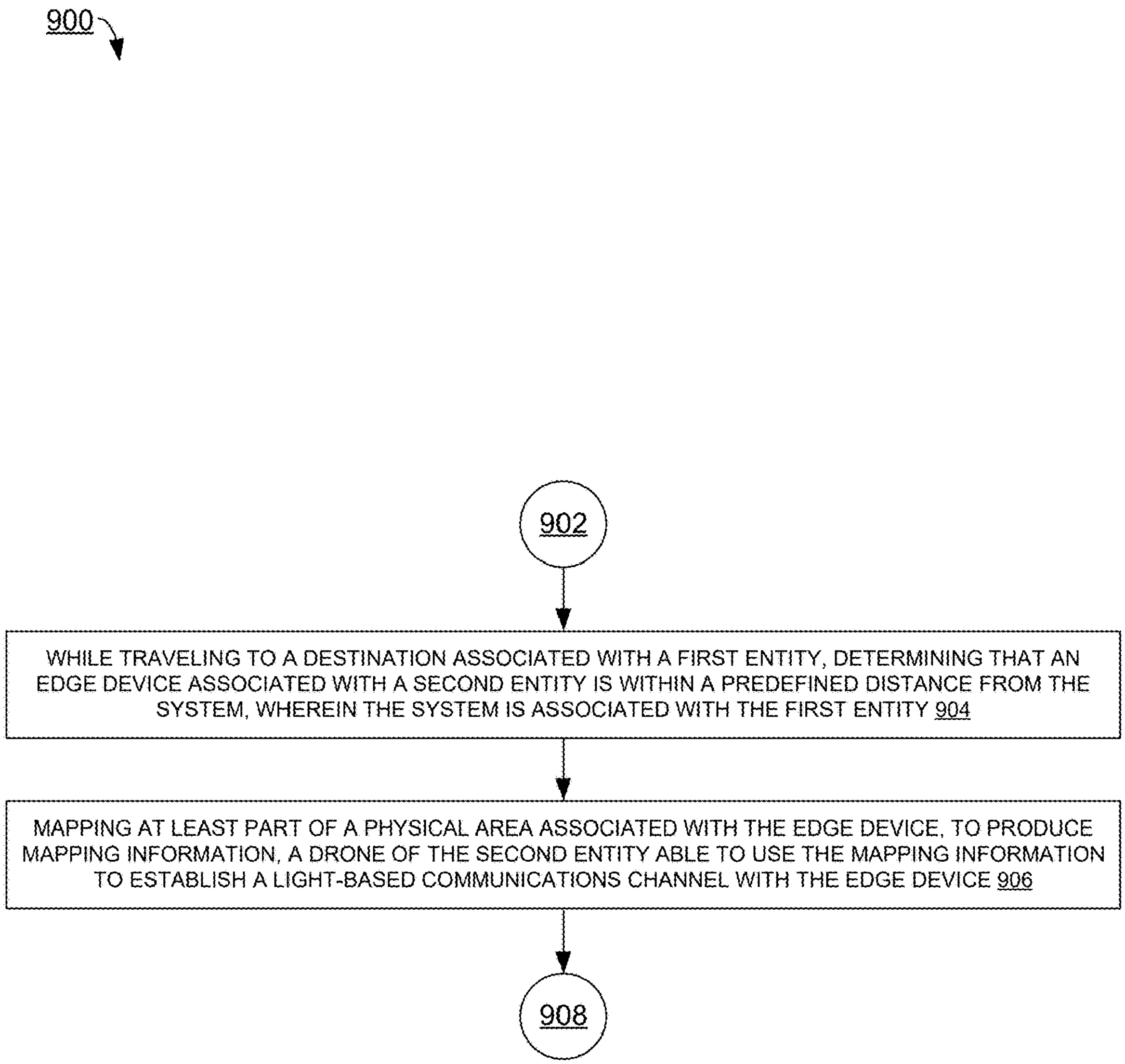

WHILE MOVING TO A DESTINATION ASSOCIATED WITH A FIRST ENTITY, DETERMINING THAT A DEVICE ASSOCIATED WITH A SECOND ENTITY IS WITHIN A DETERMINED DISTANCE FROM THE SYSTEM, WHEREIN THE SYSTEM IS ASSOCIATED WITH THE FIRST ENTITY 1004

MAPPING PART OF AN AREA ASSOCIATED WITH THE DEVICE, TO PRODUCE MAPPING INFORMATION, A DRONE DEPLOYED BY THE SECOND ENTITY USING THE MAPPING INFORMATION TO ESTABLISH A COMMUNICATIONS CHANNEL WITH THE DEVICE 1006

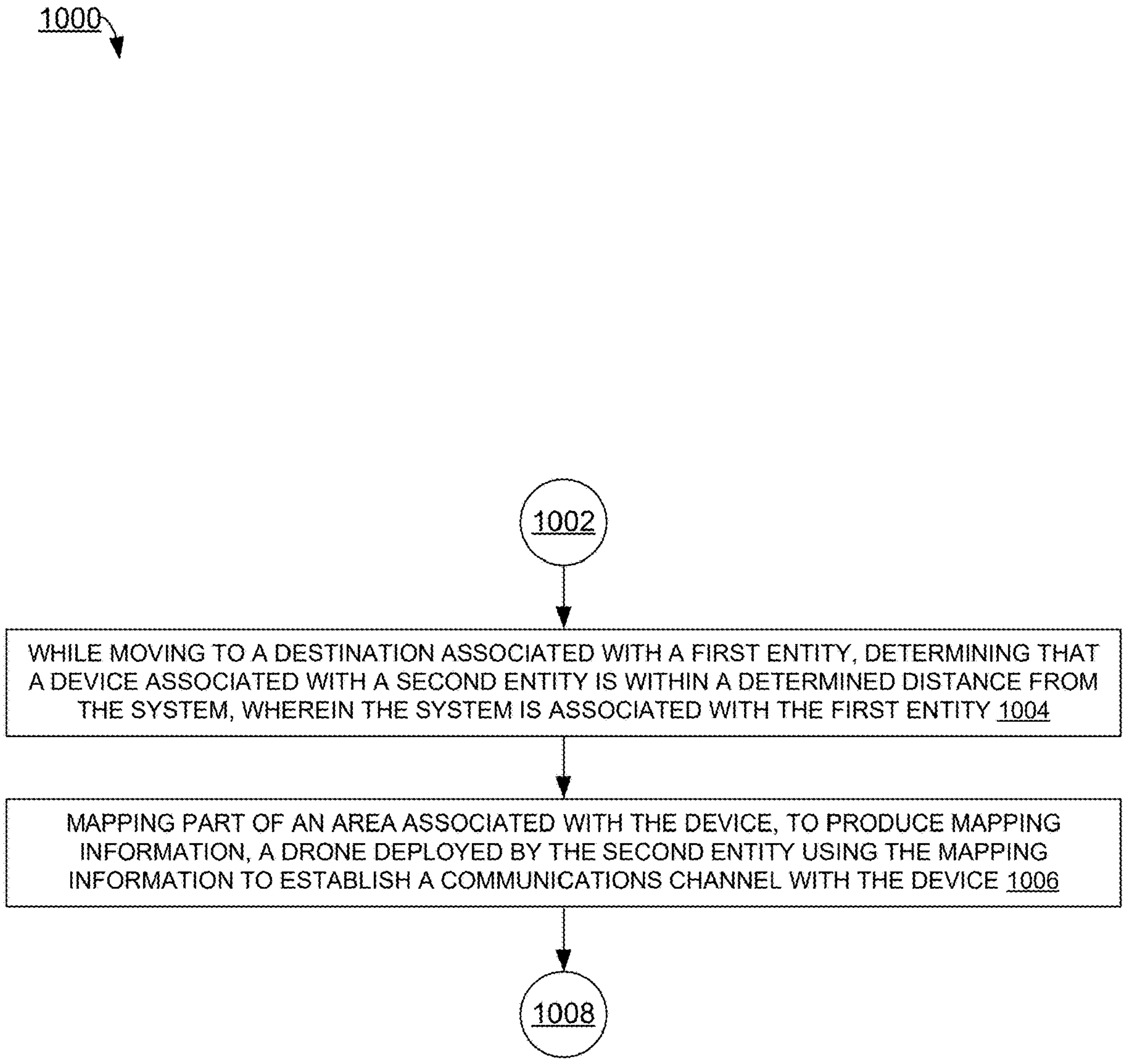

FIG. 10

DRONE PRE-MAPPING

RELATED APPLICATIONS

The subject patent application is related by subject matter to, U.S. patent application Ser. No. 18/757,350, filed Jun. 27, 2024 and entitled "ADVANCE ORIENTATION OF A DRONE ANTENNA," the entirety of which application is hereby incorporated by reference herein.

The subject patent application is related by subject matter to, U.S. patent application Ser. No. 18/757,355, filed Jun. 27, 2024 and entitled "DRONE DECISION-MAKING FOR TASK COMPLETION," the entirety of which application is hereby incorporated by reference herein.

BACKGROUND

Drones can fly between locations. Data can be transferred via wireless protocols.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can, while the system is traveling to a destination associated with a first entity, determine that an edge device associated with a second entity is located within a specified distance from the system, wherein the system is associated with the first entity. The system can map at least part of a physical area associated with the edge device, to produce mapping information. The system can enable the mapping information to be accessible to the second entity, wherein the mapping information being accessible to the second entity enables a drone associated with the second entity to use the mapping information to establish a light-based communications channel with the edge device.

An example method can comprise, while traveling to a destination associated with a first entity, determining, by a system comprising at least one processor, that an edge device associated with a second entity is within a predefined distance from the system, wherein the system is associated with the first entity. The method can further comprise mapping, by the system, at least part of a physical area associated with the edge device, to produce mapping information, a drone of the second entity able to use the mapping information to establish a light-based communications channel with the edge device.

An example non-transitory computer-readable medium can comprise instructions that, in response to execution, cause a system comprising a processor to perform operations. These operations can comprise, while moving to a destination associated with a first entity, determining that a device associated with a second entity is within a determined distance from the system, wherein the system is associated with the first entity. These operations can further comprise mapping part of an area associated with the device, to produce mapping information, a drone deployed by the second entity using the mapping information to establish a communications channel with the device.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates an example process flow that can facilitate drone pre-mapping, in accordance with an embodiment of this disclosure;

FIG. 9 illustrates another example process flow that can facilitate drone pre-mapping, in accordance with an embodiment of this disclosure;

FIG. 10 illustrates another example process flow that can facilitate drone pre-mapping, in accordance with an embodiment of this disclosure;

DETAILED DESCRIPTION

Overview

Figure 1:
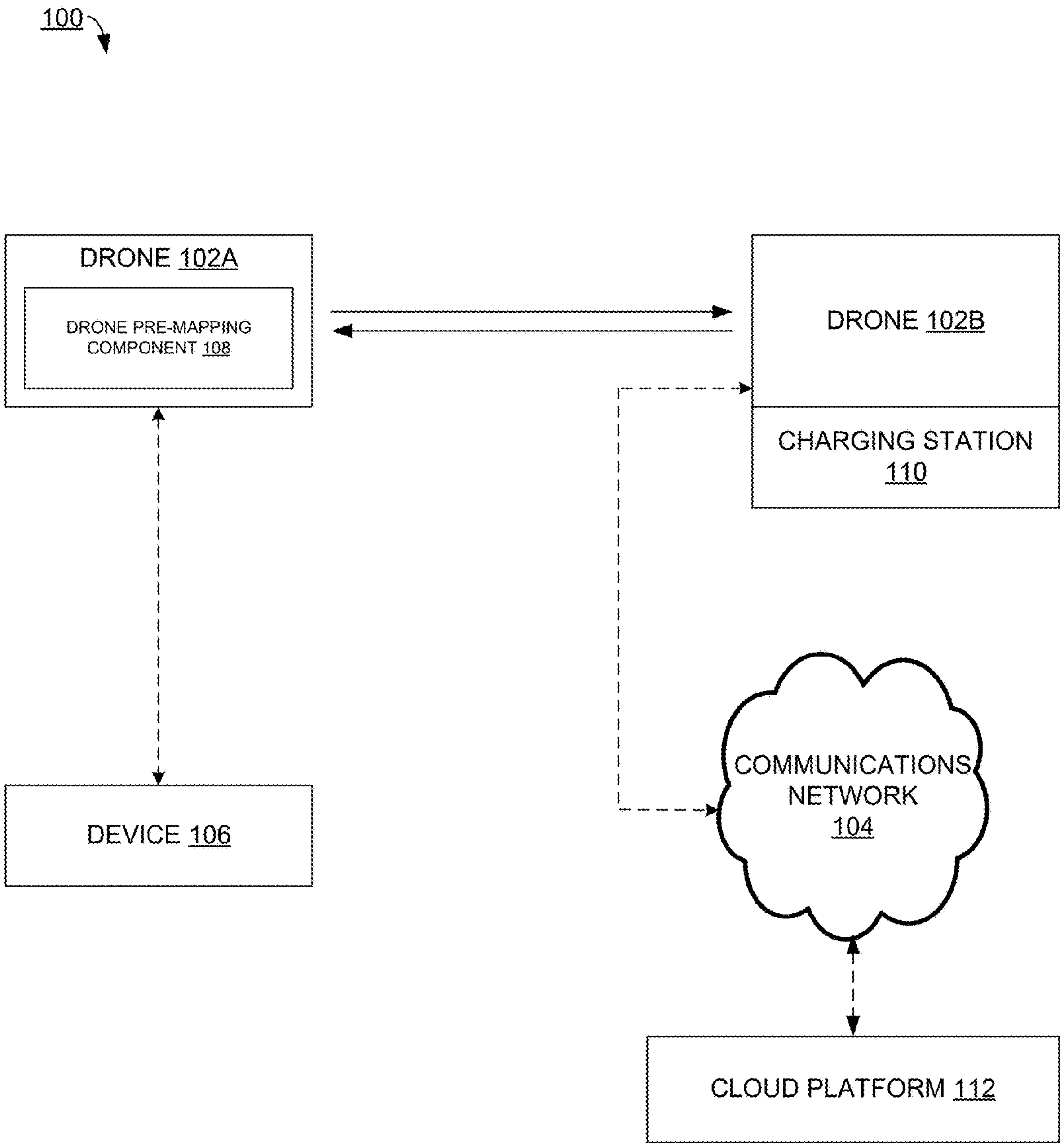
FIG. 1 illustrates an example system architecture that can facilitate drone pre-mapping, in accordance with an embodiment of this disclosure.

Remotely-located devices can be located where network infrastructure does not exist. It can be that data of these remotely-located devices' data is to be backed up (e.g., an Internet-of-Things (IoT) device, an operational technology (OT) device, a far edge device).

The present techniques can be implemented to facilitate transmission of data on scheduled-bases and in high bandwidth to keep the devices operational and remove an impact of the devices' data being unavailable.

A benefit of a wireless communication technology that uses light to transmit data (Li-Fi) is that can be used to transmit data at very high speeds.

A downside of Li-Fi can be that it is based on a wide light-spectrum (visible light, ultraviolet, and infrared).

Hence, for continuous communication, it can be that Li-Fi communication requires a clear line of communication between the transmitter and the receiver. Otherwise, it can be that the transmission cannot be transmitted directly due to topography constraints (e.g., mountains) or objects (e.g., buildings or trees).

The present techniques can be implemented to address these problems with an aeronautic-based solution is required. Where there is not a clear line of communication, there can be a secondary communication technique for ongoing and non-disruptive operation of devices that are communicating.

A device can comprise a Li-Fi transmitter, where the transmitter is positioned vertically (for a prevention of physical interference/constraints).

At a fixed cadence (which can be defined by a user), a drop that contains a Li-Fi receiver can fly over the device, where the drone serves as a data collector. Once the drone reaches its target, it can circle the target in an attempt to establish a stable Li-Fi connection.

If a stable Li-Fi connection cannot be established, the drone can establish communication via a wireless (Wi-Fi) communications protocol (which can communicate through various physical solid objects).

This approach can reduce an availability impact to devices that are served according to the present techniques.

When data has been collected, the drone can fly back to a nearest point where a stable network infrastructure exists. When the drone arrives at a charging station, it can begin transmitting the collected data to a cloud communications platform (or a computer, where a cloud communications platform, or a cloud platform, can generally comprise one or more computers that offer computer storage services).

The present techniques can be implemented to facilitate backing up remotely located devices' data to a cloud computing platform via a Li-Fi and Wi-Fi protocol switcher to establish non-interruptive communication. This backup can be performed even without an existing network infrastructure.

A drone according to the present techniques can implement pre-topology mapping for improved backup timelines, via Li-Fi geolocation techniques.

In some examples, a user utilizes a vendor's drone services, and the vendor owns the drone.

For a given user, other users' drones can be utilized for Li-Fi geolocation mapping purposes. That is, instead of one user's drone randomly trying to pick up a Li-Fi signal, other users' drones can map that user's edge device locations as those drones pass by during their other operations. This can be referred to as "pre-mapping."

This can aid in backing up data from an edge device, because there can be a correlation between the edge device's backup interval, the backup's duration, and the topology-change surrounding the edge device.

For example, if a drone-based backup interval is set to "every 6 months," and the edge device is located in the middle of a jungle, it can be that every 6 months the topology will change substantially (trees can grow or change direction, etc.).

To continue with this example, it can be that during the first year since an edge device is installed, finding a suitable Li-Fi connectivity spot by a drone can take approximately 11 minutes, because the environment was cleared by the vendor installing the edge device at a time of installation.

But after a year, it can take longer than 11 minutes to find a suitable Li-Fi connectivity spot because vegetation around the edge device has grown.

This unknown factor of finding a suitable Li-Fi connectivity spot can cause a backup-interval-availability impact, since the probing to find a suitable Li-Fi connectivity spot can take additional time. This can drain drone battery, so it can be that the drone's battery might be insufficient to perform the entire backup.

The present techniques can be implemented to reduce backup-availability. An advantage of implementing the present techniques can involve leveraging monitoring of environmental changes (e.g., tree growth) by other users' drones. That is, when another user's drone cannot pre-map a particular edge device's topology (because vegetation growth or other environmental factors have obscured the edge device), it can be determined that connectivity to the edge device is lost.

This lost connectivity can serve as a pre-impact indicator, and the edge device's user can then clear the edge's location so that connectivity can be resumed.

The present techniques can be implemented to leverage other users' drones to understand the topology of a user's edge device, off of a schedule of that user's drone traveling to that edge device.

In some examples, whether a drone maps an area around another user's edge device can be performed based on whether the drone is determined to have sufficient battery power to do that in addition to its other tasks. In some examples, such as where the drone is determined to have sufficient battery power, the drone can alter its route to map an entire area around another user's edge device.

In some examples, pre-mapping can comprise an act of determining whether the drone can establish a Li-Fi connection with the edge device from various locations. Where no Li-Fi connection can be established, it can be determined not to send a drone to communicate with that edge device (e.g., send a user's drone to communicate with that user's edge device), since it can be determined that that drone will not be able to establish a Li-Fi connection with the edge device under prevailing conditions.

Example Architectures, Etc.

FIG. 1 illustrates an example system architecture 100 that can facilitate drone pre-mapping, in accordance with an embodiment of this disclosure.

System architecture 100 comprises drone 102A, drone 102B, communications network 104, device 106, drone pre-mapping component 108, charging station 110, and cloud platform 112.

System architecture 100 presents one logical example of implementing the present techniques, and it can be appreciated that there can be other example architectures.

Figure 11:
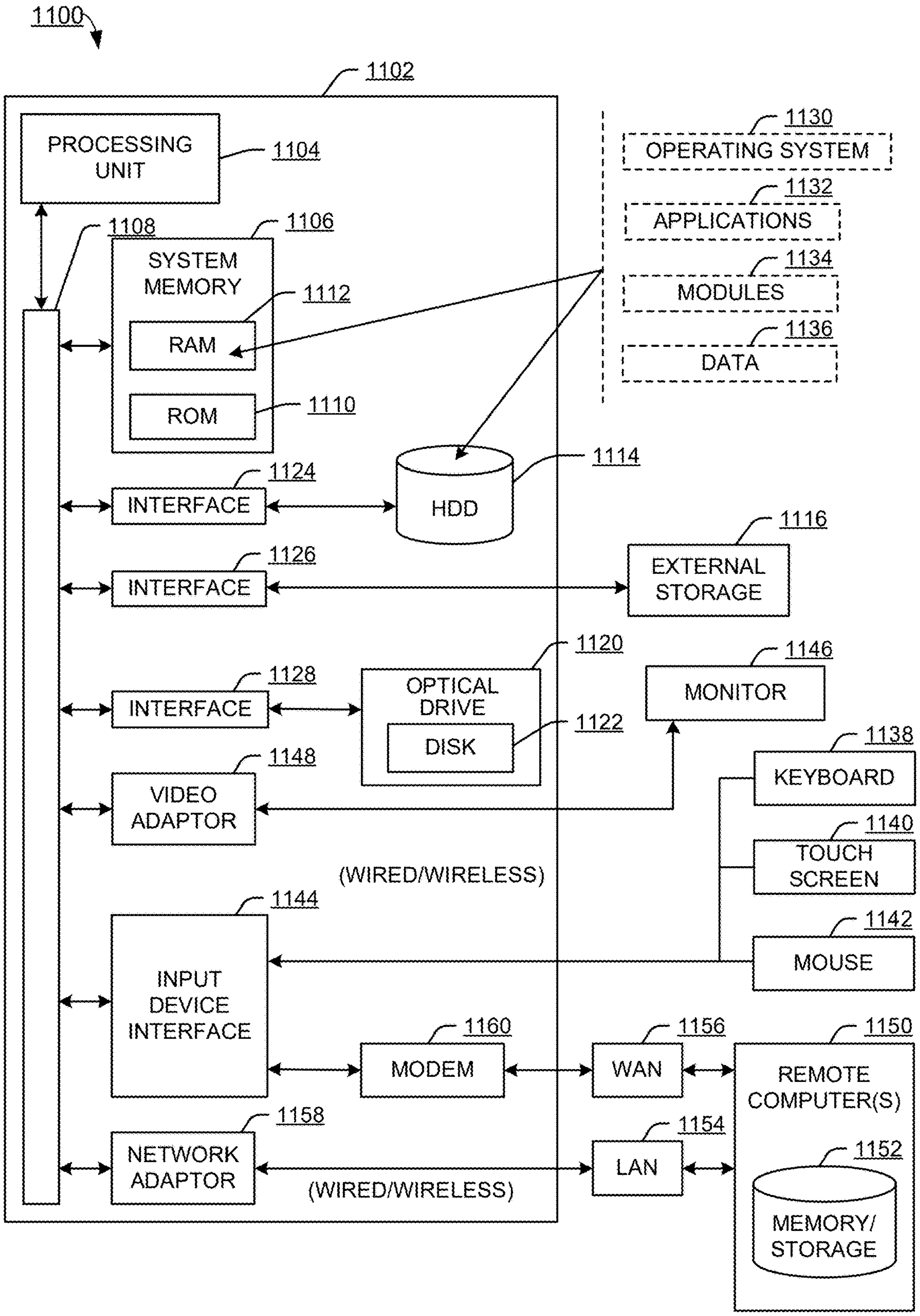
FIG. 11 illustrates an example block diagram of a computer operable to execute an embodiment of this disclosure.

Each of drone 102A, drone 102B, device 116, and/or cloud platform 112 can be implemented with part(s) of computing environment 1100 of FIG. 11. Communications network 104 can comprise a computer communications network, such as the Internet, or an intranet.

Device 116 can be a computing device that collects data (e.g., weather data from sensors), but lacks a durable network connection to upload that data to cloud platform 112. Drone 102A can travel to device 116, and establish a communications link with device 116. Drone 102A can attempt to establish a Li-Fi link, and where that is not possible, instead establish a Wi-Fi link. After collecting all new data from device 116 (or collecting data according to a criterion, such as an amount of data collected, an amount of time elapsed, or an amount of battery life left in drone 102A), drone 102A can travel toward charging and network infrastructure. This is illustrated with drone 102B.

Drone 102B can recharge at charging station 110. At this physical location, there can be sufficient network infrastructure (e.g., communications network 104) to upload data gathered from device 116 to cloud platform 112. In some examples, such as described herein, drone 102B can upload data at a physical location that is different from charging station 110—that is charging and uploading can be performed separately from each other.

In the course of traveling, to device 116, drone 102A can encounter another user's device and map at least part of the topology around that device. Then, when that other user's drone comes to that device for data backup (or other operations), that drone can use this pre-mapping information to more rapidly establish a Li-Fi connection with that device than if pre-mapping information was not used.

Figure 2:
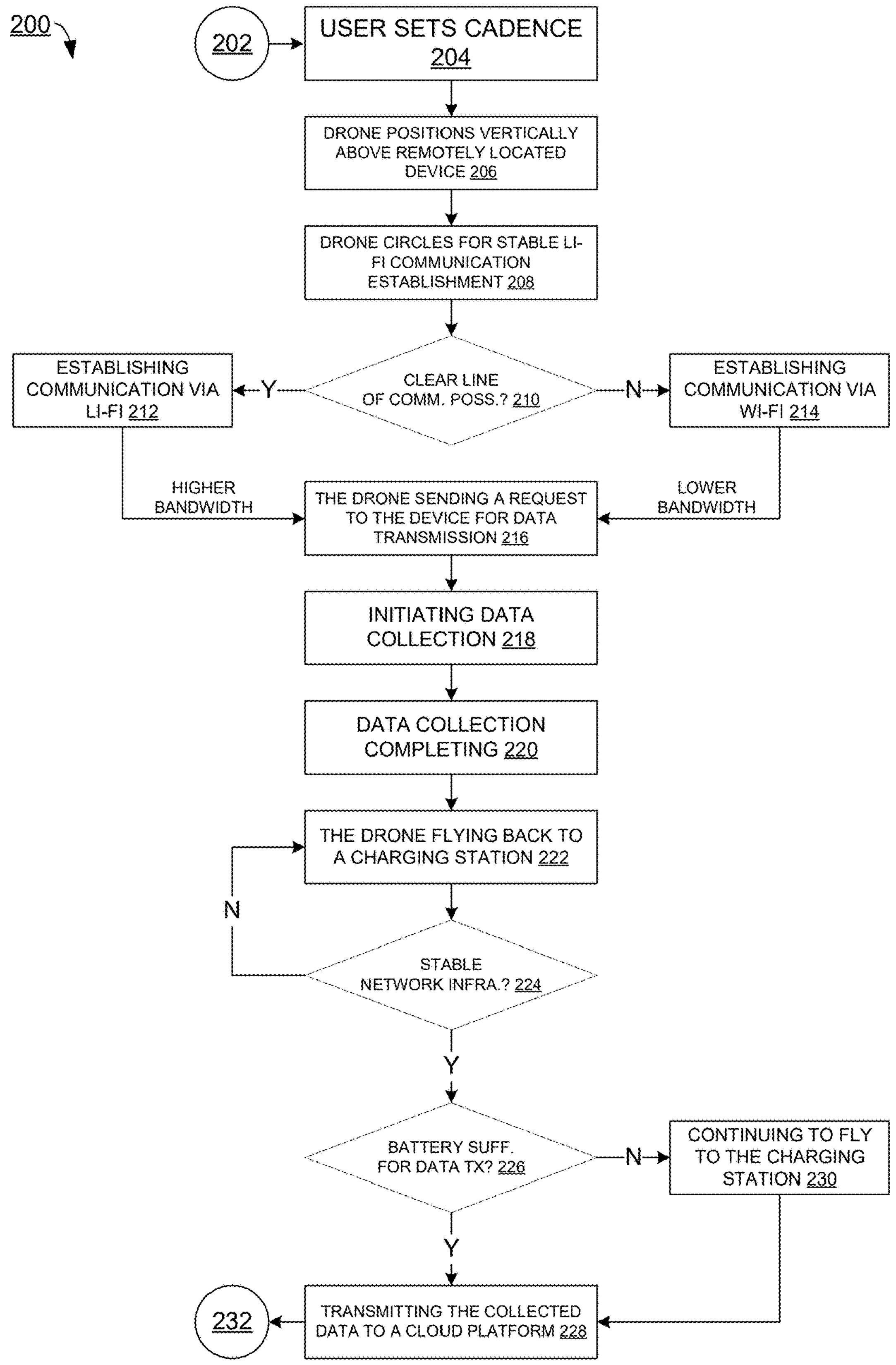
FIG. 2 illustrates an example process flow that can facilitate drone pre-mapping, in accordance with an embodiment of this disclosure.

In some examples, drone pre-mapping component 108 can implement part(s) of the process flows of FIGS. 2 and/or 8-10 to implement drone pre-mapping.

It can be appreciated that system architecture 100 is one example system architecture for drone pre-mapping, and that there can be other system architectures that facilitate drone pre-mapping.

FIG. 2 illustrates an example process flow 200 that can facilitate drone pre-mapping, in accordance with an embodiment of this disclosure. In some examples, one or more embodiments of process flow 200 can be implemented by drone pre-mapping component 108 of FIG. 1, or computing environment 1100 of FIG. 11.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 800 of FIG. 8, process flow 900 of FIG. 9, and/or process flow 1000 or FIG. 10.

Process flow 200 begins with 202, and moves to operation 204.

Operation 204 depicts user sets cadence. This can be a cadence with which a drone backs up data from a device.

After operation 204, process flow 200 moves to operation 206.

Operation 206 depicts drone positions vertically above remotely located device. While the drone travels to the remotely located device, it can encounter another user's device and pre-map that other device's topology.

After operation 206, process flow 200 moves to operation 208.

Operation 208 depicts drone circles for stable Li-Fi communication establishment.

After operation 208, process flow 200 moves to operation 210.

Operation 210 depicts determining whether a clear line of communication is possible.

Where it is determined in operation 210 that a clear line of communication is possible, process flow 200 moves to operation 212. Instead, where it is determined in operation 210 that a clear line of communication is not possible, process flow 200 moves to operation 214.

Operation 212 is reached from operation 210 where it is determined that a clear line of communication is possible. Operation 212 depicts establishing communication via Li-Fi.

After operation 212, process flow 200 moves to operation 216.

Operation 214 is reached from operation 210 where it is determined that a clear line of communication is not possible. Operation 214 depicts establishing communication via Wi-Fi.

After operation 214, process flow 200 moves to operation 216.

Operation 216 is reached from operation 212 or from operation 214.

Operation 216 depicts the drone sending a request to the device for data transmission.

After operation 216, process flow 200 moves to operation 218.

Operation 218 depicts initiating data collection.

After operation 218, process flow 200 moves to operation 220.

Operation 220 depicts data collection having completed.

After operation 220, process flow 200 moves to operation 222.

Operation 222 is reached from operation 220, or from operation 224 where it is determined that stable network infrastructure does not exist. Operation 222 depicts the drone flying back to a charging station. In some examples, this can occur according to the present techniques where the drone determines that there is not sufficient battery to travel to a next (non-charging station) destination, so instead begins flying to a charging station.

After operation 222, process flow 200 moves to operation 224.

Operation 224 depicts determining whether stable network infrastructure exists.

Where it is determined in operation 224 that stable network infrastructure exists, process flow 200 moves to operation 226. Instead, where it is determined in operation 224 that stable network infrastructure does not exist, process flow 200 returns to operation 222.

Operation 226 is reached from operation 224 where it is determined that stable network infrastructure exists. Operation 226 depicts determining whether battery is sufficient for data transmission.

Where it is determined in operation 226 that battery is sufficient for data transmission, process flow 200 moves to operation 228. Instead, where it is determined in operation 226 that battery is not sufficient for data transmission, process flow 200 moves to operation 230.

Operation 228 is reached from operation 226 where it is determined that battery is sufficient for data transmission. Operation 228 depicts transmitting the collected data to a cloud platform.

After operation 228, process flow 200 moves to 232, where process flow 200 ends.

Operation 230 is reached from operation 226 where it is determined that battery is not sufficient for data transmission. Operation 230 depicts continuing to fly to the charging station.

After operation 230, process flow 200 moves to operation 228.

Figure 3:
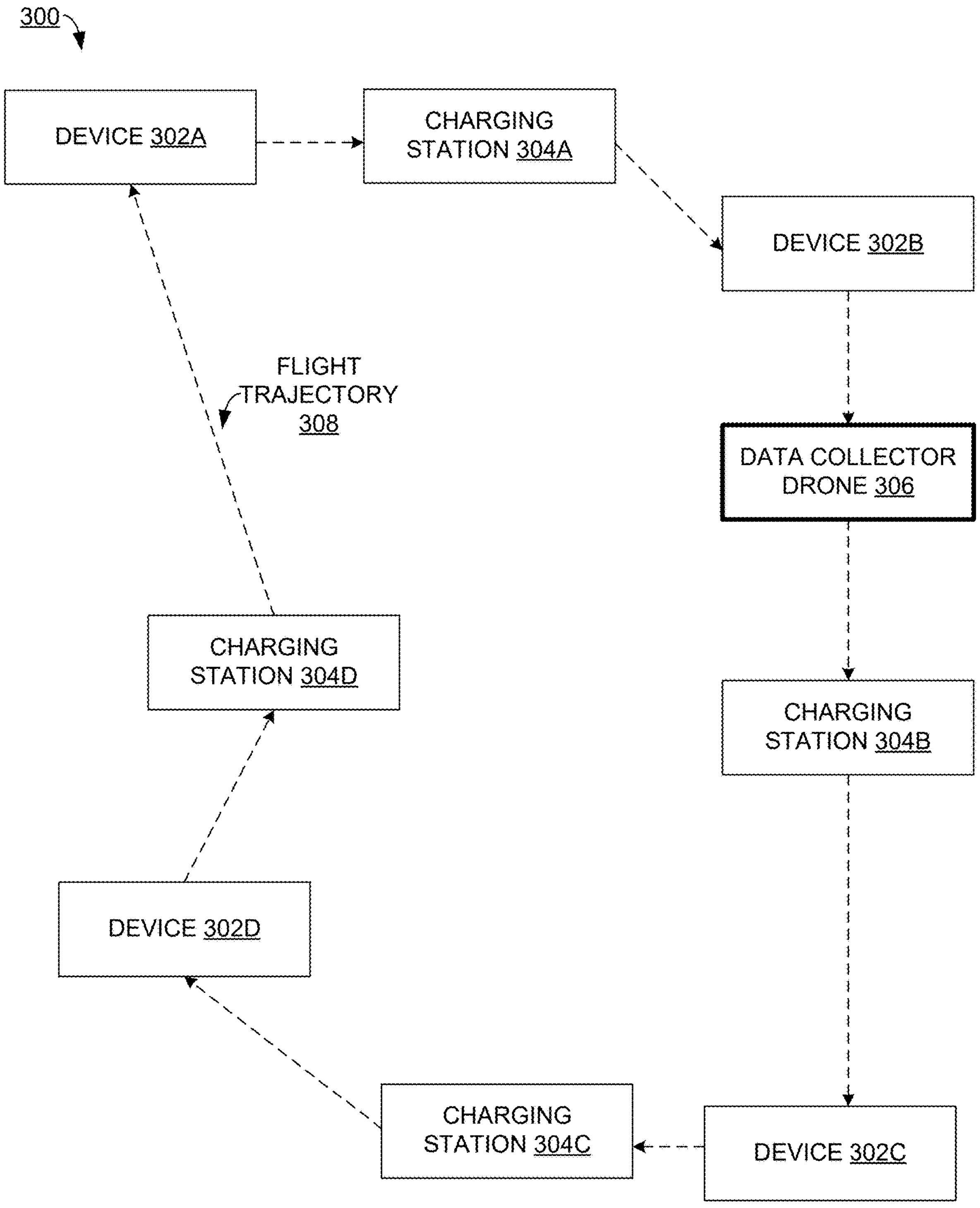
FIG. 3 illustrates an example path of a data collector drone that can facilitate drone pre-mapping, in accordance with an embodiment of this disclosure.

FIG. 3 illustrates an example path 300 of a data collector drone that can facilitate drone pre-mapping, in accordance with an embodiment of this disclosure. In some examples, parts of path 300 can be used by part(s) of system architecture 100 of FIG. 1 to facilitate drone pre-mapping.

Path 300 comprises device 302A, device 302B, device 302C, device 302D, charging station 304A, charging station 304B, charging station 304C, charging station 304D, data collector drone 306, and flight trajectory 308.

According to the present techniques, data collector drone 306 can fly along flight trajectory 308, collecting data from device 302A, device 302B, device 302C, device 302D (and uploading it to the cloud), and recharging at charging station 304A, charging station 304B, charging station 304C, at charging station 304D.

At times, data collector drone 306 can determine that it lacks sufficient battery to travel to a next destination (e.g., insufficient battery to travel directly from device 302A to device 302B without stopping at a charging station), so data collector drone 306 should stop at a charging station (e.g., charging station 304A).

At other times, data collector drone 306 can determine that it has sufficient battery to travel to a next destination (e.g., sufficient battery to travel directly from device 302A to device 302B without stopping at a charging station), so data collector drone 306 can do that-travel directly from device 302A to device 302B without stopping at a charging station.

Figure 4:
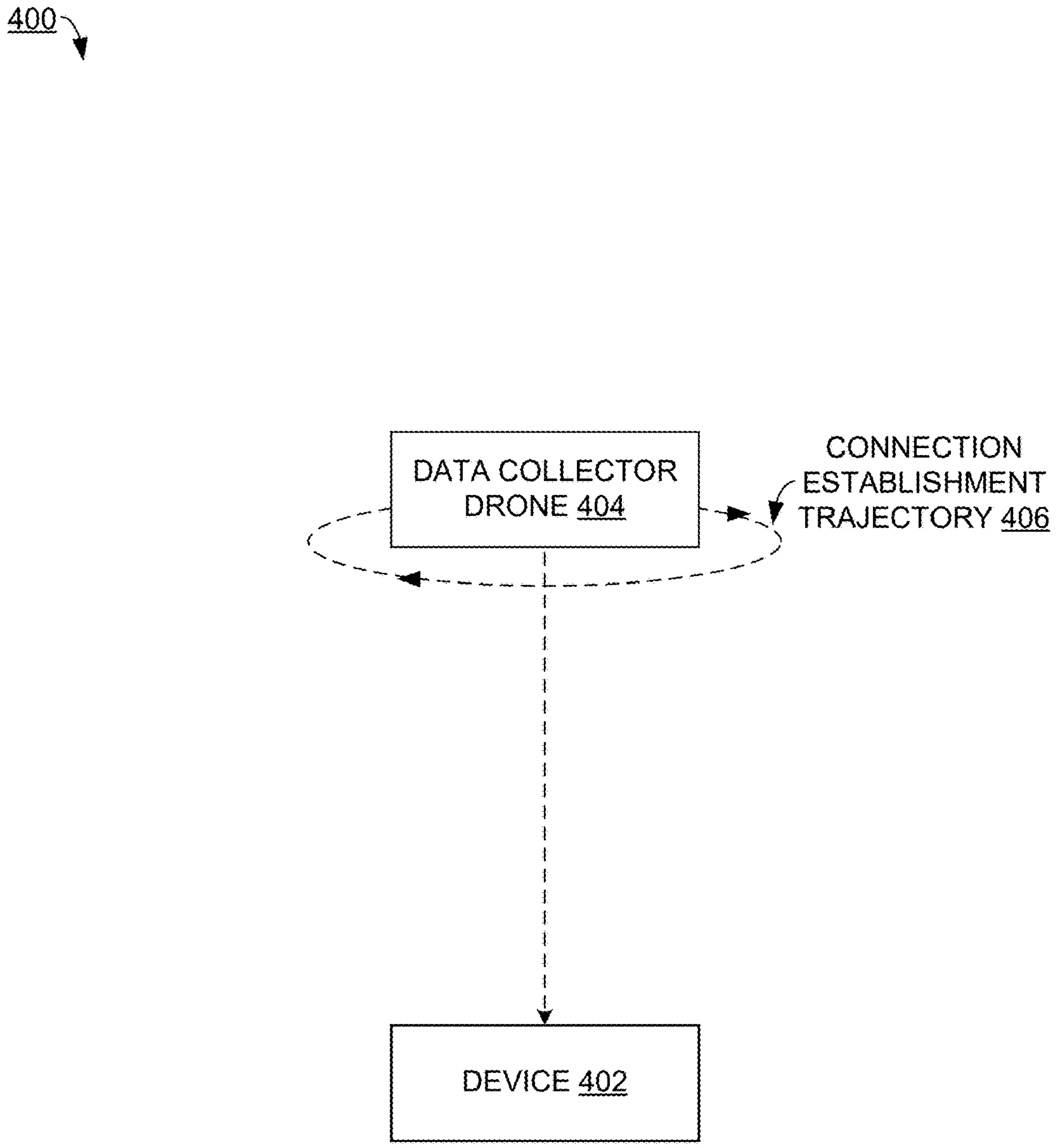
FIG. 4 illustrates an example of establishing a connection that can facilitate drone pre-mapping, in accordance with an embodiment of this disclosure.

FIG. 4 illustrates an example 400 of establishing a connection that can facilitate drone pre-mapping, in accordance with an embodiment of this disclosure. In some examples, parts of example 400 can be used by part(s) of system architecture 100 of FIG. 1 to facilitate drone pre-mapping.

System architecture 400 comprises device 402, data collector drone 404, and connection establishment trajectory 406.

When data collector drone 404 arrives at a device (e.g., device 402), data collector drone 404 can move in an area (e.g., a circle) above the device in an attempt to establish a Li-Fi connection. This can be because there can be a line-of-sight blockage between data collector drone 404 and the device from certain angles, but not others. And the blockages can change over time (e.g., plants growing).

Where data collector drone 404 has access to pre-mapping information according to the present techniques, data collector drone 404 can use this pre-mapping information to determine a location from which to establish the Li-Fi connection with device 402, which can accelerate the process of establishing the Li-Fi connection relative to not using pre-mapping information.

Figure 5:
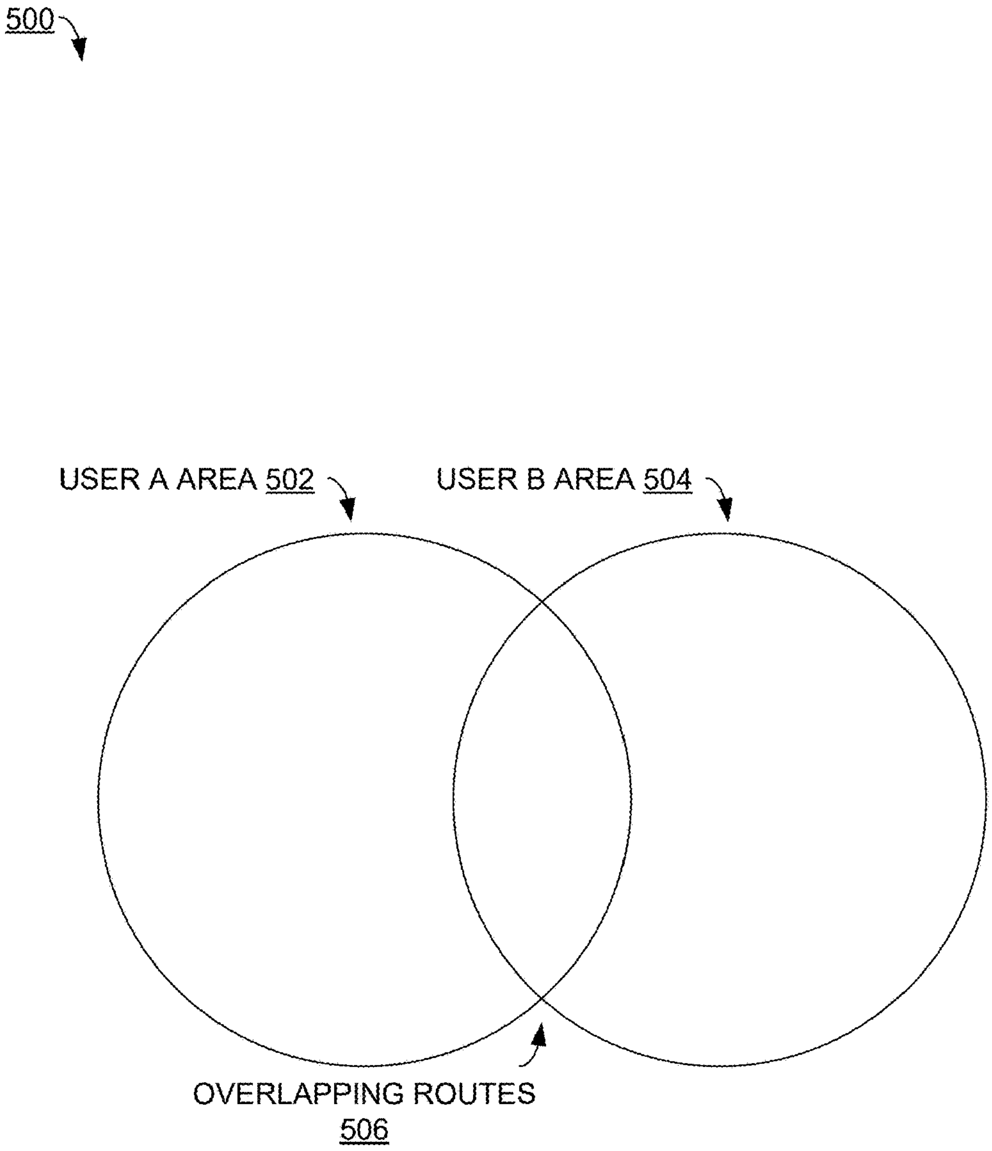
FIG. 5 illustrates an example of pre-mapping that can facilitate drone pre-mapping, in accordance with an embodiment of this disclosure.

FIG. 5 illustrates an example 500 of pre-mapping that can facilitate drone pre-mapping, in accordance with an embodiment of this disclosure. In some examples, part(s) of example 500 can be used by part(s) of system architecture 100 of FIG. 1 to facilitate drone pre-mapping.

Example 500 comprises User A area 502, user B area 504, and overlapping routes 506. A drone that is associated with User A can map User A area 502, and as a result also map part of User B area 504 (overlapping routes 506).

Similarly, a drone that is associated with User B can map User B area 504, and as a result also map part of User A area 502 (overlapping routes 506).

In this manner, overlapping routes 506 can be pre-mapped by one user's drone for another user.

Figure 6:
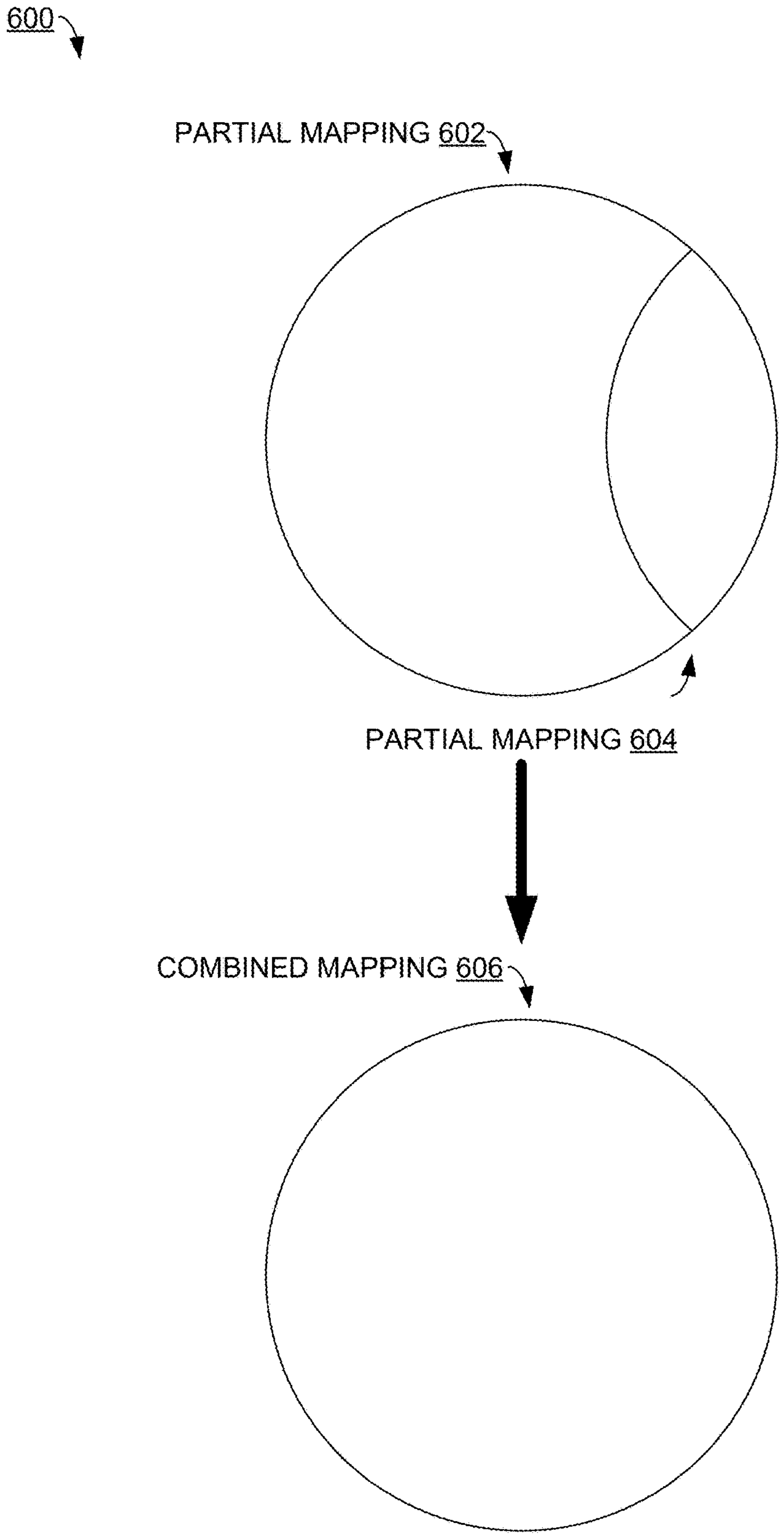
FIG. 6 illustrates an example of combining multiple mappings that can facilitate drone pre-mapping, in accordance with an embodiment of this disclosure.

FIG. 6 illustrates an example 600 of combining multiple mappings that can facilitate drone pre-mapping, in accordance with an embodiment of this disclosure. In some examples, part(s) of example 500 can be used by part(s) of system architecture 100 of FIG. 1 to facilitate drone pre-mapping.

Example 600 comprises partial mapping 602, partial mapping 604, and combined mapping 606. Continuing with the example of FIG. 5, it can be that one user's drone maps partial mapping 602 (which can overlap with partial mapping 604). After that, another user's drone can map partial mapping 604, which is a newer mapping. This mapping information can be combined into combined mapping 606, and used as pre-mapping information to aid in a drone establishing a Li-Fi (or other) connection with a remote device.

Figure 7:
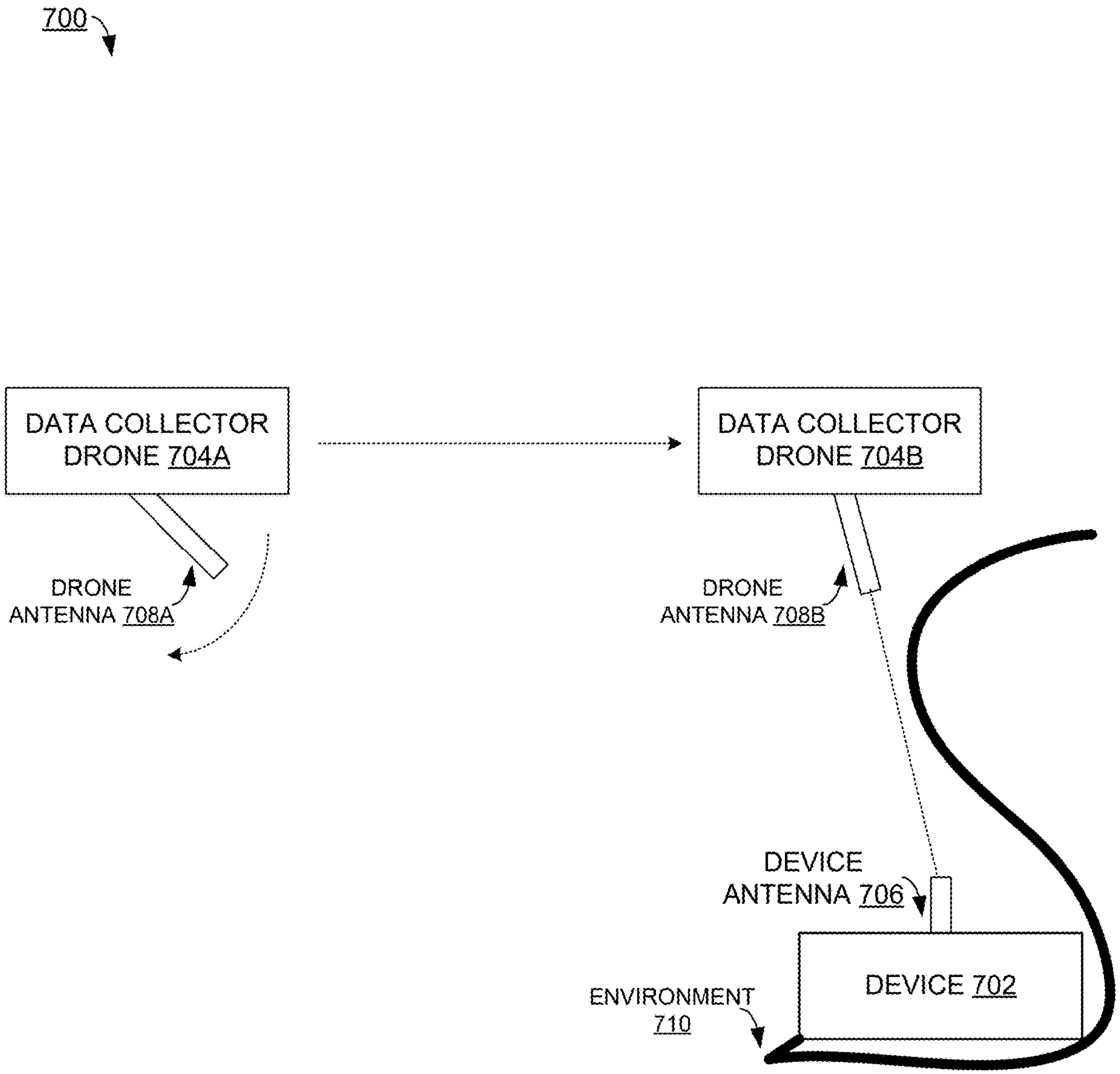
FIG. 7 illustrates an example 800 of using pre-mapping information, in accordance with an embodiment of this disclosure.

FIG. 7 illustrates an example 700 of using pre-mapping information, in accordance with an embodiment of this disclosure. In some examples, parts of example 700 can be used by part(s) of system architecture 100 of FIG. 1 to facilitate drone pre-mapping.

Example 700 comprises device 702, data collector drone 704A, data collector drone 704B, device antenna 706, drone antenna 708A, drone antenna 708B, and environment 710.

In example 700, data collector drone 704A flies toward device 702, and data collector drone 704A can orient drone antenna 708A in a manner that facilitates establishing a communications connection with device 702 via device antenna 706. A current status of environment 710 (e.g., places where a line-of-sight to device antenna 706 is occluded) can be used by data collector drone 704A in this antenna orientation, and this current status of environment 710 can be determined from pre-mapping information.

Data collector drone 704B and drone antenna 708B represent data collector drone 704A and drone antenna 708A at a later time, after the drone antenna has been oriented for establishing a connection with device 702.

Example Process Flows

FIG. 8 illustrates an example process flow 800 that can facilitate drone pre-mapping, in accordance with an embodiment of this disclosure. In some examples, one or more embodiments of process flow 800 can be implemented by drone pre-mapping component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 900 of FIG. 9, and/or process flow 1000 or FIG. 10.

Process flow 800 begins with 802, and moves to operation 804.

Operation 804 depicts, while a system is traveling to a destination associated with a first entity, determining that an edge device associated with a second entity is located within a specified distance from the system, wherein the system is associated with the first entity. In an example, the system is a drone, and this can comprise User A's drone flying to User A's location, and while doing this, passing by User B's edge device.

In some examples, the drone maps a predefined area (e.g., an area around an associated edge device without regard to the presence of another user's edge device, and the presence of the other edge device (and that the drone has performed pre-mapping for this edge device) can be determined later. In some examples, the drone maps a route it takes, and that this mapping of a route involves pre-mapping for an edge device can be determined later.

After operation 804, process flow 800 moves to operation 806.

Operation 806 depicts mapping at least part of a physical area associated with the edge device, to produce mapping information. This can comprise pre-mapping, such as discussed with respect to FIGS. 5-6.

In some examples, operation 806 comprises, based on determining that the mapping information fails to satisfy a sufficiency criterion relating to a defined sufficiency of information in the mapping information, determining that the drone is unable to establish the light-based communications channel with the edge device. In some examples, the physical area is a first physical area, and operation 806 comprises, further based on the determining that the mapping information fails to satisfy the sufficiency criterion, storing an indication to clear a second physical area around the edge device. In some examples, the mapping information is determined to fail to satisfy the sufficiency criterion as a result of plant growth that occludes a line-of-sight between the system and the edge device.

That is, pre-mapping activities can result in determining that a device's topology cannot be mapped currently (because a connection with the device cannot be established). A result of this determination can be to indicate to physically clear an area (e.g., pare back vegetation) around the device.

In some examples, the physical area associated with the edge device comprises a substantially circular area that is substantially centered on the edge device. That is, pre-mapping an area that corresponds to a device can comprise mapping a substantially circular area around the device.

After operation 806, process flow 800 moves to operation 808.

Operation 808 depicts enabling the mapping information to be accessible to the second entity, wherein the mapping information being accessible to the second entity enables a drone associated with the second entity to use the mapping information to establish a light-based communications channel with the edge device. This can comprise the pre-mapping of one user's drone being used by another user's drone, such as discussed with respect to FIGS. 5-6.

In some examples, the mapping information is first mapping information, the first mapping information is combined with second mapping information to produce combined mapping information, and the drone associated with the second entity uses the combined mapping information to establish the light-based communications channel with the edge device. That is, it can be that User A's drone overlaps with only part of the area that User B maps, so User A's partial mapping information can be integrated with other mapping information for User B. This can be similar to the example of FIG. 6.

In some examples, the drone associated with the second entity uses the mapping information to estimate an amount of time associated with establishing the light-based communications channel with the edge device. That is, pre-mapping information can be used to estimate how long it will take a drone to establish a Li-Fi connection with an edge device.

After operation 808, process flow 800 moves to 810, where process flow 800 ends.

FIG. 9 illustrates an example process flow 900 that can facilitate drone pre-mapping, in accordance with an embodiment of this disclosure. In some examples, one or more embodiments of process flow 900 can be implemented by drone pre-mapping component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 800 of FIG. 8, and/or process flow 1000 or FIG. 10.

Process flow 900 begins with 902, and moves to operation 904.

Operation 904 depicts, while traveling to a destination associated with a first entity, determining that an edge device associated with a second entity is within a predefined distance from the system, wherein the system is associated with the first entity. In some examples, operation 904 can be implemented in a similar manner as operation 804 of FIG. 8. After operation 904, process flow 900 moves to operation 906.

Operation 906 depicts mapping at least part of a physical area associated with the edge device, to produce mapping information, a drone of the second entity able to use the mapping information to establish a light-based communications channel with the edge device. In some examples, operation 906 can be implemented in a similar manner as operations 806-808 of FIG. 8.

In some examples, the mapping information is first mapping information, the first mapping information is combined with second mapping information to produce combined mapping information, and the drone of the second entity uses the combined mapping information to establish the light-based communications channel with the edge device.

In some examples, the drone of the second entity uses the mapping information to estimate an amount of time associated with establishing the light-based communications channel with the edge device.

In some examples, operation 906 comprises, based on determining that the mapping information fails to satisfy a sufficiency criterion defining a threshold accuracy of the mapping information to be usable, determining that the drone is unable to establish the light-based communications channel with the edge device. In some examples, the physical area is a first physical area, and operation 906 comprises, further based on the determining that the mapping information fails to satisfy the sufficiency criterion, storing an indication to clear a second physical area around the edge device. In some examples, the mapping information fails to satisfy the sufficiency criterion as a result of plant growth that occludes a line-of-sight between the system and the edge device.

In some examples, the physical area associated with the edge device comprises a substantially circular area, and the edge device is located at a center, or about the center, of the substantially circular area.

After operation 906, process flow 900 moves to 908, where process flow 900 ends.

FIG. 10 illustrates an example process flow 1000 that can facilitate drone pre-mapping, in accordance with an embodiment of this disclosure. In some examples, one or more embodiments of process flow 1000 can be implemented by drone pre-mapping component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 200 of FIG. 2, process flow 800 of FIG. 8, and/or process flow 900 or FIG. 9.

Process flow 1000 begins with 1002, and moves to operation 1004.

Operation 1004 depicts, while moving to a destination associated with a first entity, determining that a device associated with a second entity is within a determined distance from the system, wherein the system is associated with the first entity. In some examples, operation 1004 can be implemented in a similar manner as operation 804 of FIG. 8.

After operation 1004, process flow 1000 moves to operation 1006.

Operation 1006 depicts mapping part of an area associated with the device, to produce mapping information, a drone deployed by the second entity using the mapping information to establish a communications channel with the device. In some examples, operation 1006 can be implemented in a similar manner as operations 806-808 of FIG. 8.

In some examples, the mapping information is first mapping information, the first mapping information is combined with second mapping information to produce combined mapping information, and the drone deployed by the second entity uses the combined mapping information to establish the communications channel with the device.

In some examples, the drone deployed by the second entity uses the mapping information to estimate an amount of time associated with establishing the communications channel with the device.

In some examples, operation 1006 comprises, based on determining that the mapping information fails to satisfy a criterion defining a threshold amount of information to be present in the mapping information to be usable, determining that the drone lacks a capability to establish the communications channel with the device. In some examples, the physical area is a first physical area, and operation 1006 comprises, further based on the determining that the mapping information fails to satisfy the sufficiency criterion, storing an indication to remove a physical object from a second physical area around the device. In some examples, the mapping information is determined to fail to satisfy the sufficiency criterion as a result of a physical object that occludes a line-of-sight between the system and the device.

After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of drone 102A, drone 102B, device 116, and/or cloud platform 112.

In some examples, computing environment 1100 can implement one or more embodiments of the process flows of FIGS. 2 and/or 8-10 to facilitate drone pre-mapping.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 (containing disk 1122) can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A first aerial drone, comprising:

at least one processor; and at least one memory that stores executable instructions that, when executed by the at least one processor, facilitate performance of operations, comprising:

while the first aerial drone is traveling to a destination associated with a first entity, determining that an edge device associated with a second entity is located within a specified distance from the first aerial drone, wherein the first aerial drone is associated with the first entity;

based on the determining that the edge device associated with the second entity is located within the specified distance from the first aerial drone, autonomously mapping, by the first aerial drone, at least part of a physical area associated with the edge device, to produce mapping information; and enabling the mapping information to be accessible to the second entity, wherein the mapping information being accessible to the second entity enables a second aerial drone associated with the second entity to use the mapping information to establish a light-based communications channel with the edge device, and wherein the first aerial drone is separate from the second aerial drone.

2. The first aerial drone of claim 1, wherein the mapping information is first mapping information, wherein the first mapping information is combined with second mapping information to produce combined mapping information, and wherein the drone associated with the second entity uses the combined mapping information to establish the light-based communications channel with the edge device.

3. The first aerial drone of claim 1, wherein the drone associated with the second entity uses the mapping information to estimate an amount of time associated with establishing the light-based communications channel with the edge device.

4. The first aerial drone of claim 1, wherein the physical area associated with the edge device comprises a substantially circular area that is substantially centered on the edge device.

5. The first aerial drone of claim 1, wherein the mapping of at least the part of the physical area associated with the edge device, to produce the mapping information, comprises:

based on determining that the mapping information fails to satisfy a sufficiency criterion relating to a defined sufficiency of information in the mapping information, determining that the drone is unable to establish the light-based communications channel with the edge device.

6. The first aerial drone of claim 5, wherein the physical area is a first physical area, and wherein the operations further comprise:

further based on the determining that the mapping information fails to satisfy the sufficiency criterion, storing an indication to clear a second physical area around the edge device.

7. The first aerial drone of claim 5, wherein the mapping information is determined to fail to satisfy the sufficiency criterion as a result of plant growth that occludes a line-of-sight between the system and the edge device.

8. A method, comprising:

while traveling to a destination associated with a first entity, determining, by a first aerial drone comprising at least one processor, that an edge device associated with a second entity is within a predefined distance from the first aerial drone, wherein the first aerial drone is associated with the first entity; and based on the determining that the edge device is located within the predefined distance from the first aerial drone, autonomously mapping, by the first aerial drone, at least part of a physical area associated with the edge device, to produce mapping information, a second aerial drone of the second entity able to use the mapping information to establish a light-based communications channel with the edge device.

9. The method of claim 8, wherein the mapping information is first mapping information, wherein the first mapping information is combined with second mapping information to produce combined mapping information, and wherein the drone of the second entity uses the combined mapping information to establish the light-based communications channel with the edge device.

10. The method of claim 8, wherein the drone of the second entity uses the mapping information to estimate an amount of time associated with establishing the light-based communications channel with the edge device.

11. The method of claim 8, wherein the physical area associated with the edge device comprises a substantially circular area, and wherein the edge device is located at a center, or about the center, of the substantially circular area.

12. The method of claim 8, wherein the mapping comprises:

based on determining that the mapping information fails to satisfy a sufficiency criterion defining a threshold accuracy of the mapping information to be usable, determining, by the first aerial drone, that the second aerial drone is unable to establish the light-based communications channel with the edge device.

13. The method of claim 12, wherein the physical area is a first physical area, and further comprising:

further based on the determining that the mapping information fails to satisfy the sufficiency criterion, storing, by the first aerial drone, an indication to clear a second physical area around the edge device.

14. The method of claim 12, wherein the mapping information fails to satisfy the sufficiency criterion as a result of plant growth that occludes a line-of-sight between the first aerial drone and the edge device.

15. A non-transitory computer-readable medium comprising instructions that, in response to execution, cause a first aerial drone comprising at least one processor to perform operations, comprising:

while moving to a destination associated with a first entity, determining that a device associated with a second entity is within a determined distance from the first aerial drone, wherein the first aerial drone is associated with the first entity; and based on the determining that the device is located within the determined distance from the first aerial drone, autonomously mapping, by the first aerial drone, part of an area associated with the device, to produce mapping information, a second aerial drone deployed by the second entity using the mapping information to establish a communications channel with the device.

16. The non-transitory computer-readable medium of claim 15, wherein the mapping information is first mapping information, wherein the first mapping information is combined with second mapping information to produce combined mapping information, and wherein the second aerial drone deployed by the second entity uses the combined mapping information to establish the communications channel with the device.

17. The non-transitory computer-readable medium of claim 15, wherein the second aerial drone deployed by the second entity uses the mapping information to estimate an amount of time associated with establishing the communications channel with the device.

18. The non-transitory computer-readable medium of claim 15, wherein the mapping of the part of the physical area associated with the device, to produce the mapping information, comprises:

based on determining that the mapping information fails to satisfy a criterion defining a threshold amount of information to be present in the mapping information to be usable, determining that the second aerial drone lacks a capability to establish the communications channel with the device.

19. The non-transitory computer-readable medium of claim 18, wherein the physical area is a first physical area, and wherein the operations further comprise:

further based on the determining that the mapping information fails to satisfy the sufficiency criterion, storing an indication to remove a physical object from a second physical area around the device.

20. The non-transitory computer-readable medium of claim 18, wherein the mapping information is determined to fail to satisfy the sufficiency criterion as a result of a physical object that occludes a line-of-sight between the first aerial drone and the device.

* * * * *